(12) United States Patent
Sehara et al.

(10) Patent No.: US 8,824,254 B2
(45) Date of Patent: Sep. 2, 2014

(54) OPTICAL DISK DEVICE

(71) Applicant: Funai Electric Co., Ltd., Osaka (JP)

(72) Inventors: Syunsuke Sehara, Osaka (JP); Shinya Shimizu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/862,000

(22) Filed: Apr. 12, 2013

(65) Prior Publication Data

US 2013/0301397 A1 Nov. 14, 2013

(30) Foreign Application Priority Data

May 10, 2012 (JP) ................................ 2012-108922

(51) Int. Cl.
*G11B 7/00* (2006.01)
*G11B 20/10* (2006.01)
*G11B 7/09* (2006.01)

(52) U.S. Cl.
CPC ........ *G11B 20/10037* (2013.01); *G11B 7/0903* (2013.01); *G11B 2220/2537* (2013.01); *G11B 20/10388* (2013.01); *G11B 20/10046* (2013.01); *G11B 7/094* (2013.01)
USPC .................................... 369/44.29; 369/44.34

(58) Field of Classification Search
None
See application file for complete search history.

(56) References Cited

U.S. PATENT DOCUMENTS

| 2007/0280066 A1* | 12/2007 | Liao et al. .................. 369/44.29 |
| 2009/0252009 A1* | 10/2009 | Kubota et al. ................ 369/53.3 |
| 2010/0195464 A1* | 8/2010 | Katayama et al. ........... 369/59.1 |

FOREIGN PATENT DOCUMENTS

| JP | 2005-085355 A | 3/2005 |
| JP | 2008-084415 A | 4/2008 |

* cited by examiner

*Primary Examiner* — Thang Tran
(74) *Attorney, Agent, or Firm* — Osha Liang LLP

(57) ABSTRACT

An optical disc device includes an optical pickup that causes a laser beam to be incident on an optical disc and detects a reflected beam, an A/D converter that converts into a digital signal a plurality of analog signals obtained from the reflected beam detected by the optical pickup, an error signal generating circuit that generates a servo signal for the optical pickup based on the digital signal converted by the A/D converter, a low-pass filter that removes noise of a specific band included in the servo error signal generated by the error signal generating circuit, a main processor that switches a noise removal band of the low-pass filter based on states of the optical disc, and an actuator that performs servo control for the optical pickup based on the servo error signal from which the noise has been removed by the low-pass filter.

18 Claims, 10 Drawing Sheets

OPTICAL DISK DEVICE

FIELD OF TECHNOLOGY

The present invention relates generally to a servo device for an optical pickup used in writing and reading of an optical disc.

BACKGROUND ART

In writing and reading specific information on an optical disc, the laser beam that is incident on the optical disc must track the optical disc track precisely. This tracking is performed through controlling a tracking actuator using a tracking error signal that is obtained through illuminating the laser beam onto the optical disc.

Moreover, the laser beam that is incident onto the optical disc must be focused precisely into a focal point on the reflective surface of the optical disc, requiring control of the distance between the optical disc and the object lens that focuses the laser beam. To do this, a focusing error signal is produced and this focusing error signal is used in controlling a focus actuator.

The principle behind the three-laser beam method will be explained briefly next. As illustrated in FIG. 9, a main laser beam (A, B, C, and D) is positioned in the center, and to sub-laser beams (E and F) are positioned on either side thereof. The offset of the two sub-laser beams forward and back is to prevent loss of the detecting signal. In FIGS. 9(a), (b) and (c), the (b) position is where the spot of the main laser beam is directly over the track, showing the best state. In this state, the sub-laser beams E and F are both following so as to be slightly on the track, where the latter laser beam is on the so-called mirror surface wherein there are no pits, where the light of this part is reflected from the optical disc to arrive at the detector (not shown). The reflected beam signal from the sub-laser beam E and the reflected beam signal from the sub-laser beam F are inputted from the detector into a differential amplifier, illustrated in FIG. 10, and, in this case, the signal from the differential amplifier (the sub-tracking error signal) is zero.

Moreover, when the position of the laser beam deviates slightly from this, so that the laser beam position goes to that which is illustrated in (a) or (c) of FIG. 9, a signal that is the difference between the sub-laser beam E and the sub-laser beam F is outputted from the differential amplifier. In the case of (a), this is a positive output, and in the case of (c), this is a negative output, producing a polarized sub-tracking error signal. That is, this produces information regarding the side of the track to which there is misalignment, and information regarding the magnitude of the misalignment of the laser beam.

The circuit for producing the tracking error signal will be explained next. Here, the explanation will be for the case of the three-laser beam system, as illustrated in FIG. 9, wherein a main laser beam (A, B, C, and D) is incident on the track of the optical disc and respective sub-laser beams (E, and F) are incident on the mirror regions on either side of the track. The reflected beam of the main laser beam (A, B, C, and D), and of the sub-laser beams (E and F) are incident through optical pickups into detectors that convert the incident reflected beams into electric currents, and electric signals are outputted from the detectors.

At this time, the reflected beam of the main laser beam (A, B, C, and D), as illustrated in FIG. 9, is detected by a detector wherein a single spot is divided into four regions. The output signals from the detector are defined as A1, B1, C1, and D1, corresponding to the main laser beam. Moreover, the reflected beams from the sub-laser beams (E and F) are detected by the respective detectors. The output signals corresponding to the sub-beams from the detectors are defined as E1 and F1.

The production of the tracking error signal by the circuit illustrated in FIG. 11 will be explained using these signals. The circuit in FIG. 11 is a tracking error signal generating circuit 110 that is structured from a main tracking error signal generating circuit, a sub-tracking error signal generating circuit, and other circuitry. The tracking error signal generating circuit 110 has amplifiers 120 to 123 for amplifying the signals from the detectors, and low-pass filters 130 to 133 for removing the noise components.

Moreover, the tracking error signal generating circuit 110 comprises A/D converters 140 to 143 for converting into digital signals the analog signals F1 and E1, and (A1+D1) and (B1+C1), after the amplification process by the amplifiers 120 to 123 and after the filter process, and amplifiers 150 to 153, for adjusting the balance of the outputs of the signals F1, E1, (A1+D1), and (B1+C1) after the A/D conversions.

The difference between the output from the amplifier 150 and the output from the amplifier 151 is taken and inputted into a gain controller (AGC) 160. Similarly, the difference between the output of the amplifier 152 and the output of the amplifier 153 is taken and inputted into an AGC 161. Moreover, the tracking error signal generating circuit 110 is provided with low-pass filters 170 and 171 for removing the respective noises included in the outputs of the gain controllers (AGCs) 160 and 161. The output of the low-pass filter 170, from which the noise has been removed, is the sub-tracking error signal, and the output from the low-pass filter 171 is the main tracking error signal. The difference between the sub-tracking error signal and the main tracking error signal passes through an attenuator 180 and a low-pass filter 190 that adjust the signal level, to produce the tracking error signal.

Moreover, Patent Document 1 describes the generation of a stabilized tracking error signal wherein saturation of the output of the sub-tracking error signal due to eccentricity of the optical disc, or the like, is prevented.

Furthermore, Patent Document 2 describes a technology for performing tracking by detecting the magnitude of eccentricity of the optical disc and selecting a tracking error signal produced through the DPD method (Differential Phase Detection method) if the magnitude of eccentricity is greater than a value that is set in advance, or using a tracking error signal produced through the DPP method (Differential Push-Pull method) if the magnitude of eccentricity is smaller than the value that is set in advance.

PATENT DOCUMENTS

[Patent Document 1] Japanese Unexamined Patent Application Publication 2005-85355
[Patent Document 2] Japanese Unexamined Patent Application Publication 2008-84415

The tracking error signal, produced as described above, is used when controlling the tracking position on an optical disc using the three-laser method. At this time, in some cases, in order to reduce the number of circuits within the optical disc device, the aforementioned A/D converters 140 to 143 perform A/D conversion through time division using a single A/D converter. In this case, the individual analog signals obtained from the three sub-laser reflected beams undergo A/D conversion through time division using a single A/D converter, and thus there will be a time lag in the outputs from the A/D converter. For example, when a WRITE START signal is received during reading of an optical disc, one of the two sub-laser beam signals outputted from the detector will receive that which has undergone time-division A/D conversion during reading, and the other sub-laser beam signal will receive that which has undergone time-division A/D conversion after writing has started, which may produce a discrepancy.

Here the power of the laser beam at the time of writing in an optical disc device is several times larger than the power of the laser beam during reading. In this way, there are differences in the power of the laser beam between writing and reading, and thus if one of the sub-laser beam signals is received during reading and the other sub-laser beam signal is received after writing has started, as described above, then there will be a difference in the outputs in the two sub-laser beam signals from the detector, which destabilizes the tracking control.

One or more embodiments of the present invention provide an optical disc device that enables good servo control even when performing A/D conversion wherein detected signals are received through time division when performing servo control of an optical pickup wherein a plurality of beams reflected from an optical disc are detected.

SUMMARY OF THE INVENTION

In general, according to one aspect of the present invention, an optical disc device includes an optical pickup that causes a laser beam to be incident on an optical disc and detects a reflected beam; A/D converting means for converting into a digital signal a plurality of analog signals obtained from the reflected beam detected by the optical pickup; servo error signal generating means for generating a servo signal for the optical pickup based on the digital signal converted by the A/D converting means; noise removing means for removing noise of a specific band included in the servo error signal generated by the servo error signal generating means; noise removal band switching means for switching a noise removal band of the noise removing means based on states of the optical disc; and servo controlling means for performing servo control for the optical pickup based on the servo error signal from which noise has been removed by the noise removing means.

In general, according to another aspect of the present invention, an optical disc device includes an optical pickup that causes a laser beam to be incident on an optical disc and detects a reflected beam; an A/D converter that converts into a digital signal a plurality of analog signals obtained from the reflected beam detected by the optical pickup; an error signal generating circuit that generates a servo signal for the optical pickup based on the digital signal converted by the A/D converter; a low-pass filter that removes noise of a specific band included in the servo error signal generated by the error signal generating circuit; a main processor that switches a noise removal band of the low-pass filter based on states of the optical disc; and an actuator that performs servo control for the optical pickup based on the servo error signal from which noise has been removed by the low-pass filter.

In general, according to another aspect of the present invention, a servo control method for an optical disc device, the method including causing a laser beam to be incident on an optical disc and detecting a reflected beam; converting into a digital signal a plurality of analog signals obtained from the reflected beam; generating a servo signal based on the converted digital signal; removing noise of a specific band included in the generated servo error signal; switching a noise removal band based on states of the optical disc; and performing servo control based on the servo error signal from which noise has been removed.

According to one or more embodiments, the states of the optical disc may include states during reading of the optical disc, writing of the optical disc, switching from reading to writing, and switching from writing to reading.

According to one or more embodiments of the present invention, in an optical disc device of a system wherein two analog signals obtained from reflected laser beams are converted into two digital signals through time division using single A/D converting means, stabilized servo control of the optical pickup is possible even when there is an instruction to start writing while the optical disc is being read.

BRIEF DESCRIPTIONS OF THE DRAWINGS

DETAILED DESCRIPTION OF THE INVENTION

First Embodiment

Figure 1:
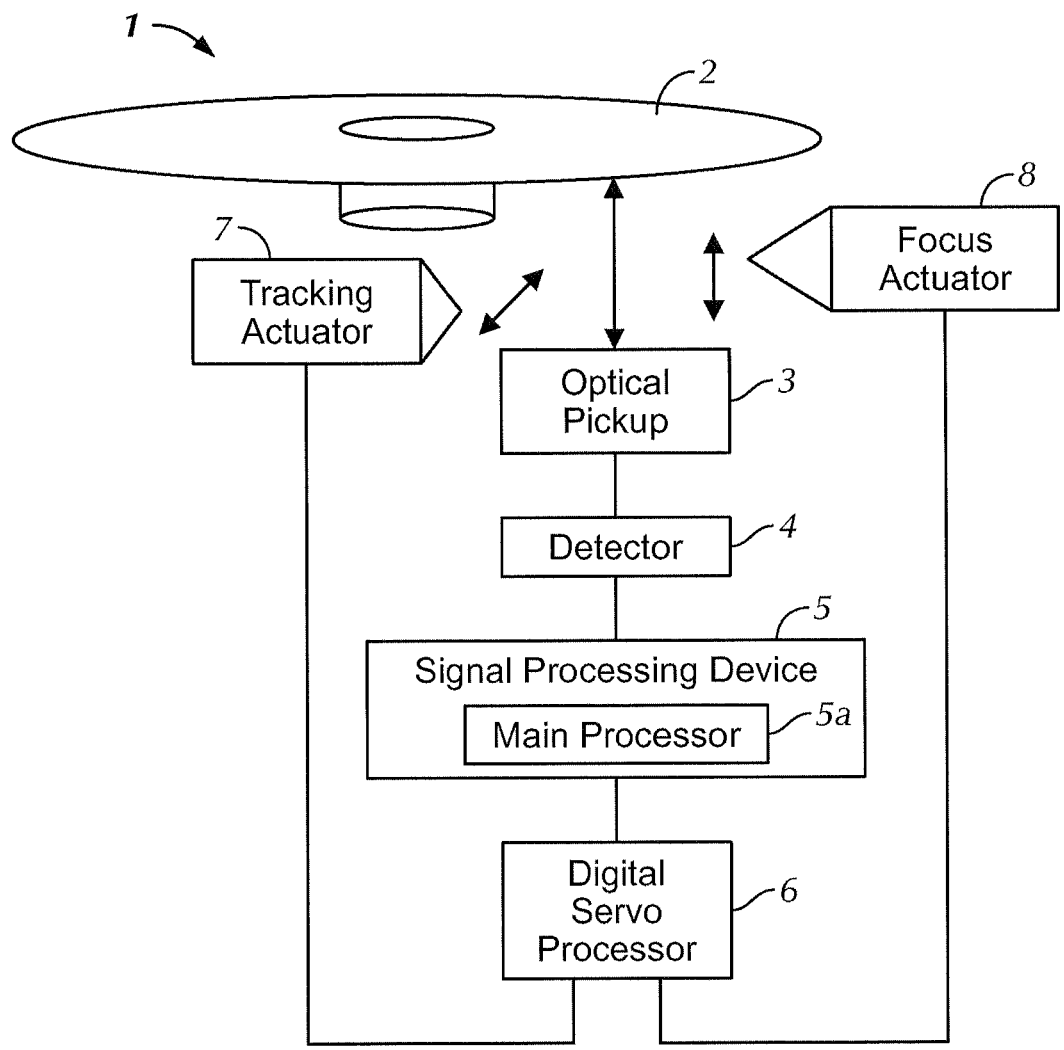
FIG. 1 is an electrical block structural diagram of an optical disc device according to a first embodiment of the present invention.

A first embodiment of the present invention will be explained. The tracking operation, and the like, will be explained first. FIG. 1 is a block diagram of an optical disc device 1 according to the first embodiment. It has a detector 4 that causes a laser beam to be incident on an optical disc 2 of the optical disc device 1, detects, through an optical pickup 3, a beam reflected from the optical disc 2, converts the detected reflected beam into an electric current, and outputs a signal for the data read out from the optical disc 2, an output signal for focus error detection, and an output signal for tracking error detection, and also has a signal processing device 5 for generating a tracking error signal and a focus error signal from the output signals for detecting, outputted from the detector 4. The signal processing device 5 is provided with a main processor 5a (noise removal band switching means) for switching noise removal frequencies of a low-pass filter 60 (noise removing means), illustrated in FIG. 2.

The tracking error signal and the focus error signal are inputted into a digital servo processor 6 from the signal processing device 5. The digital servo processor 6 not only controls a tracking actuator 7 (servo controlling means) that drives the optical pickup 3, in response to the tracking error signal, so that the optical pickup 3 will follow the track of the optical disc 2, but also controls a focus actuator (servo controlling means) 8 to adjust appropriately the distance between the object lens (not shown), which is provided in the optical pickup 3, and the optical disc 2.

Figure 9:
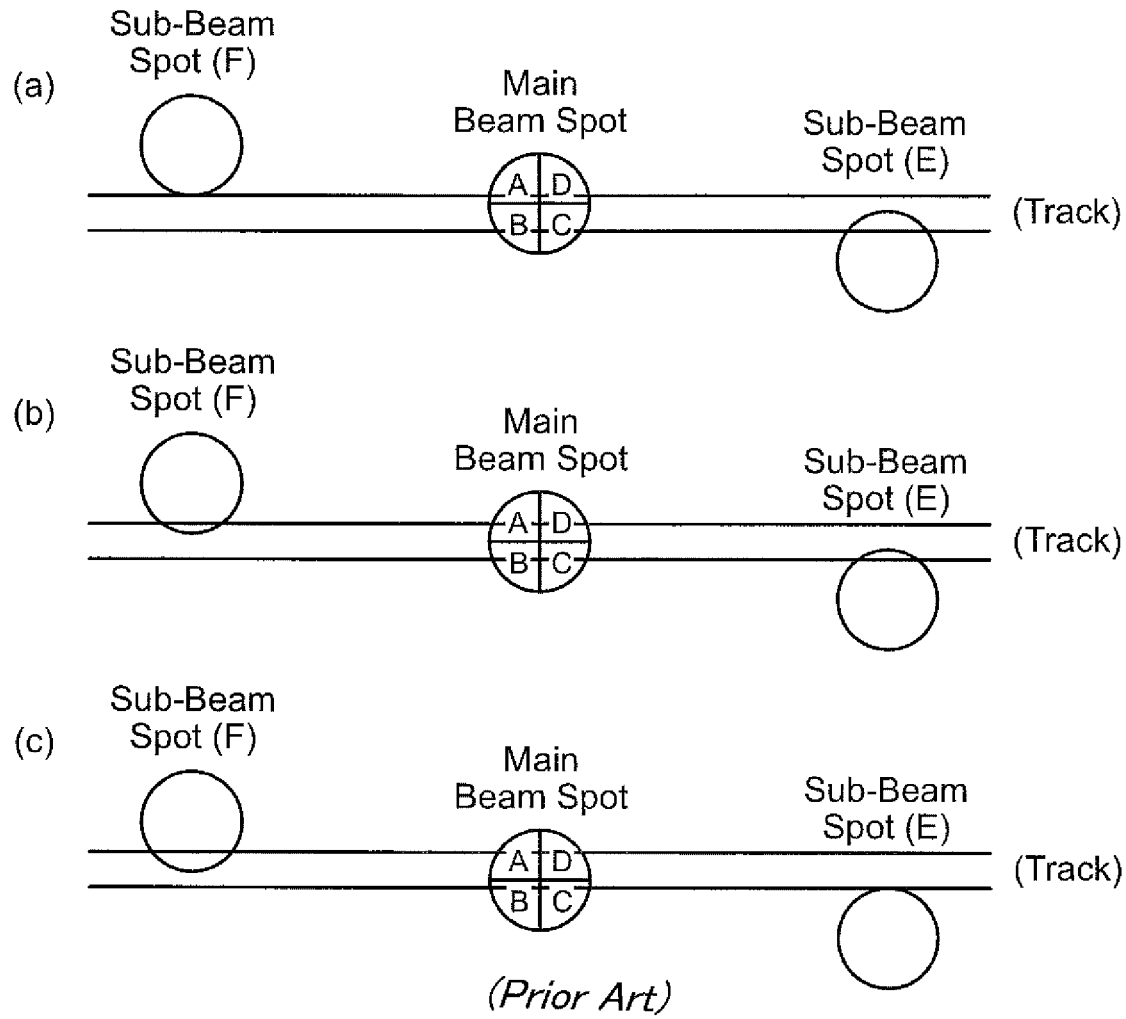
FIG. 9 is a diagram for explaining the conventional three-laser beam method for performing tracking control.
Figure 10:
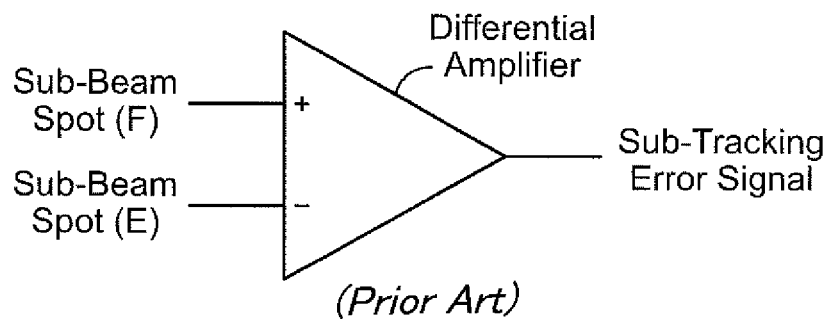
FIG. 10 is a diagram illustrating the tracking error signal outputted based on the reflected beams of the conventional sub-tracking beams.

The circuit for generating the tracking error signal in the signal processing device 5 will be explained next. As with the explanation for the prior art, this will be explained using FIG. 9. The case of the three-laser beam method, as illustrated in FIG. 9, wherein a main laser beam (A, B, C, and D) is caused to be incident onto a track of the optical disc 2, and sub-laser beams (E and F) are caused to be incident on respective mirror regions on both sides of the track, will be explained. As illustrated in FIG. 1, the reflected beams from the main laser beam (A, B, C, and D) and the sub-laser beams (E and F) are incident into a detector 4 through the optical pickup 3 to be converted into the electric signals.

Following this, as illustrated in FIG. 9, the reflected beam of the main laser beam (A, B, C, and D) is detected by the detector 4, with a single spot divided into four regions. Output signals corresponding to the main laser beam (A, B, C, and D) from the detector 4 are defined as A1, B1, C1, and D1. The respective reflected beams from the sub-laser beams (E and F) are detected by the detector 4. The output signals corresponding to the sub-beams (E and F) from the detector 4 are defined as E1 and F1.

Figure 2:
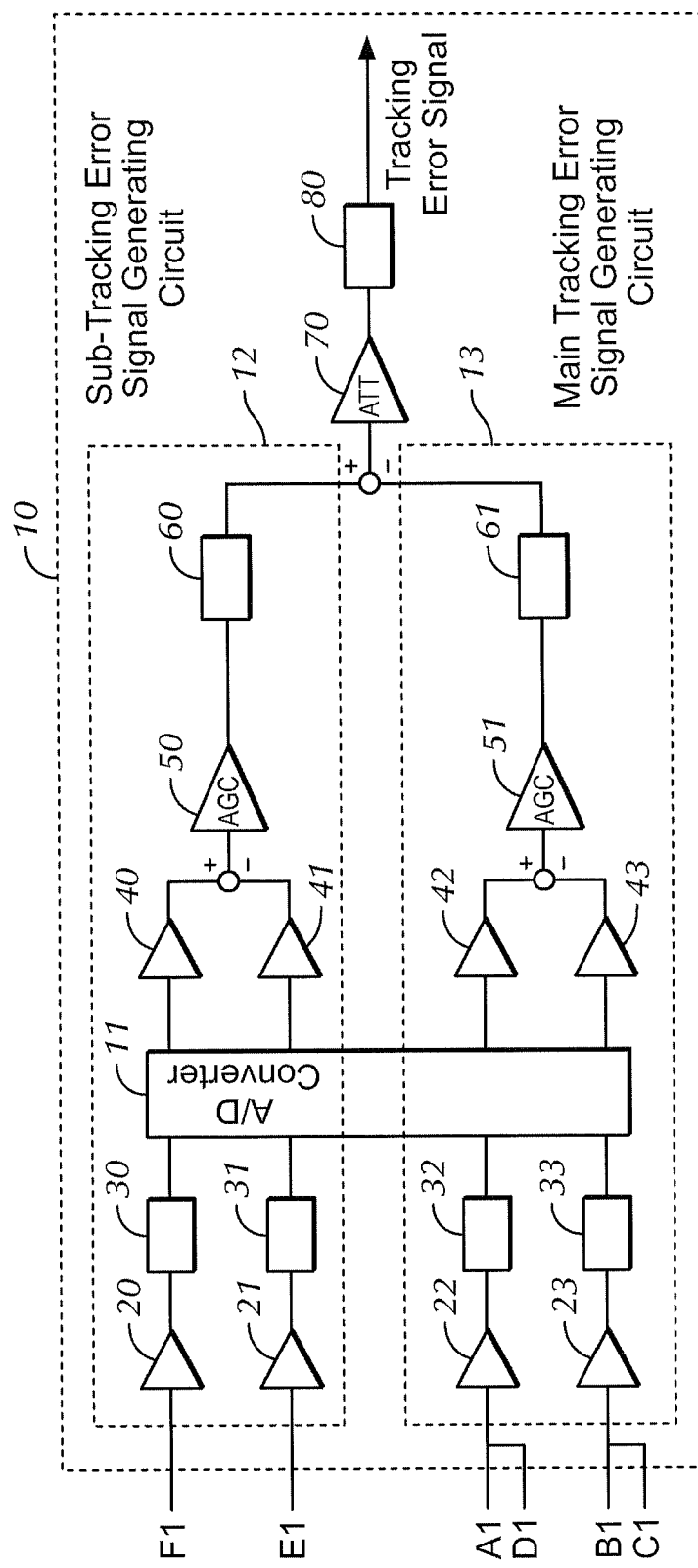
FIG. 2 is a circuit diagram of the tracking error signal generating circuit of the optical disc device according to the first embodiment of the present invention.
Figure 11:
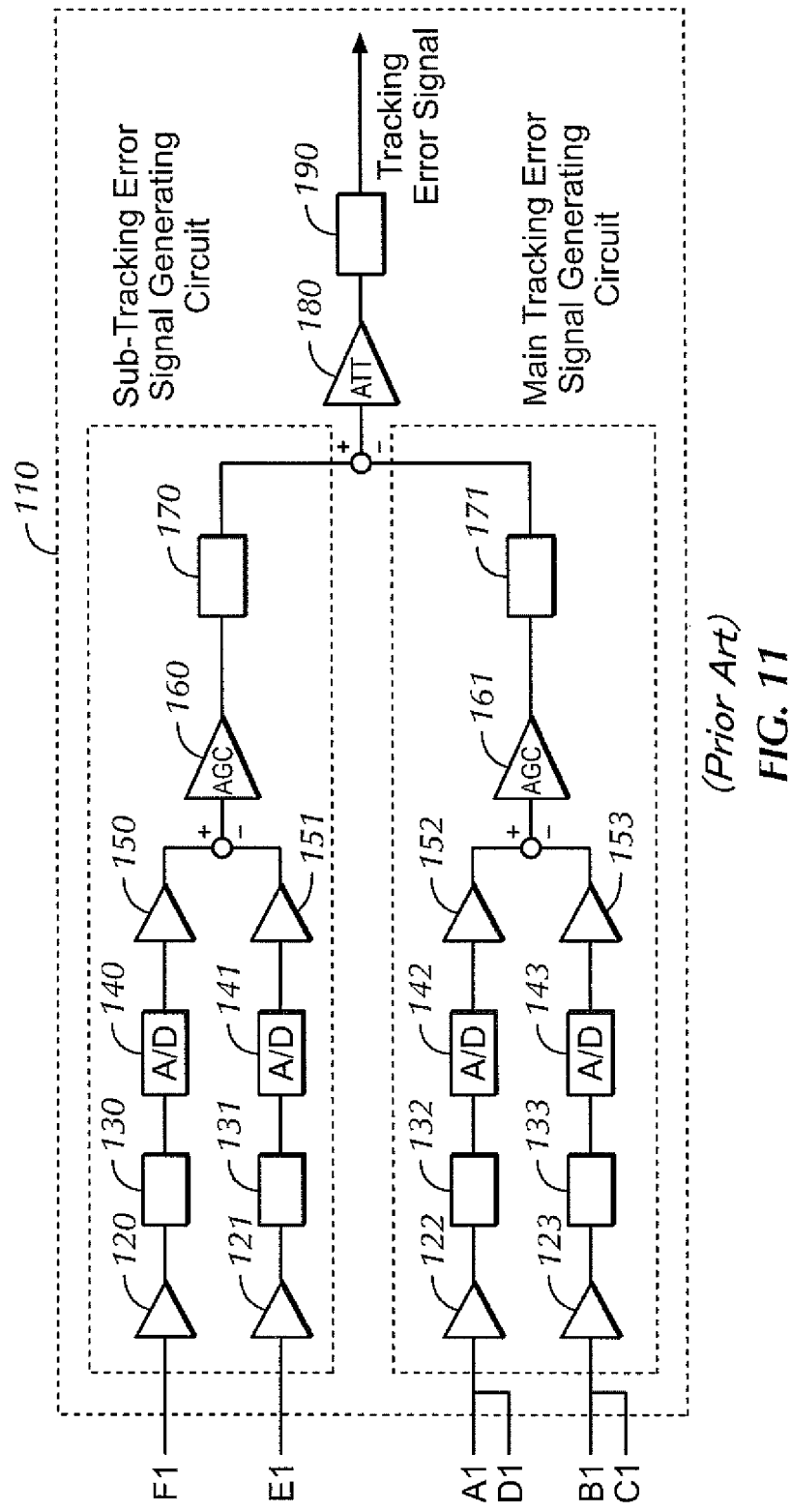
FIG. 11 is a circuit diagram of a tracking error signal generating circuit of a conventional example.

The generation of the tracking error signal by the circuit illustrated in FIG. 2, using these signals, will be explained next. The circuit in FIG. 2 is the tracking error signal generating circuit 10, structured from a main tracking error signal generating circuit 13 and a sub-tracking error signal generating circuit 12 (servo error signal generating means), and other circuitry. Note that the difference between the tracking error signal generating circuit 10 of the first embodiment of the present invention and the tracking error signal generating circuit 110 of FIG. 11 is the point that the A/D converters 140 to 143 are replaced with a single A/D converter 11 (A/D converting means), with A/D conversion performed through time division.

The tracking error signal generating circuit 10 illustrated in FIG. 2 has amplifiers 20 to 23 for amplifying the signals from the detector 4, and low-pass filters 30 to 33 for removing the noise components.

Furthermore, the tracking error signal generating circuit 10 is provided with a single A/D converter 11, for converting into digital signals, through time division, the analog signals F1, E1, (A+D1), and (B1+C1) after they have undergone an amplification process in the amplifiers 20 to 23 and undergone a filtering process, and also provided with amplifiers 40 to 43 for adjusting the power balance of the signals F1, E1, (A1+D1), and (B1+C1) after A/D conversion.

The difference between the output from the amplifier 40 and the output from the amplifier 41 is taken and inputted into a gain controller (AGC) 50. Similarly, the difference between the output of the amplifier 42 and the output of the amplifier 43 is taken and inputted into an AGC 51. Moreover, the tracking error signal generating circuit 10 is provided with low-pass filters 60 and 61 for removing the respective noises included in the outputs of the gain controllers (AGCs) 50 and 51. The output of the low-pass filter 60, from which the noise has been removed, is the sub-tracking error signal, and the output from the low-pass filter 61 is the main tracking error signal. The difference between the sub-tracking error signal and the main tracking error signal passes through an attenuator 70 and a low-pass filter 80 that adjust the signal level, to produce the tracking error signal. The low-pass filters 60 and 61 are digital filters, wherein the frequency for removing noise can be switched.

The optical disc device 1 according to the first embodiment of the present invention performs stabilized tracking control through improving the quality of the sub-tracking error signal through setting to an intermediate noise removal band between the noise removal band of the low-pass filter 60 when reading and the noise removal band of the low-pass filter 60 when writing, when switching from reading to a writing stage.

Figure 3:
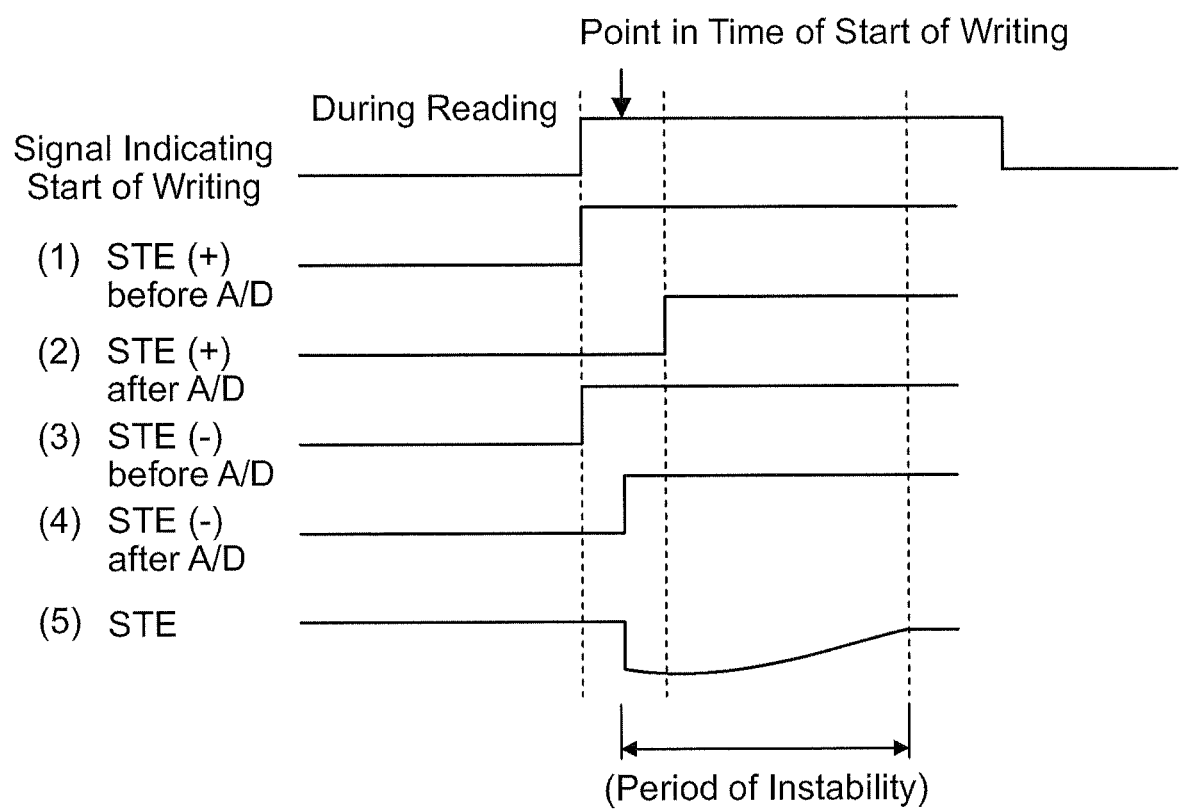
FIG. 3 is a diagram illustrating the relationships between the sub-tracking signals when switching from reading to writing in a conventional optical disc device.

FIG. 3 describes the state of the sub-tracking error signal in a conventional optical disc device when switching from reading to a writing stage, illustrating how an unstable period is produced in the sub-tracking error signal (STE).

The sub-tracking error signal (+) when reading, as indicated by (1), is in the low state. Following this, at the point that writing is started, the sub-tracking error signal (+) must go to the high state. However, the sub-tracking error signal (+) that is received through the time-division A/D conversion by the A/D converter 11 is still in the low state, as indicated by (2), at the point in time wherein the writing is started.

Moreover, as indicated by (3), the sub-tracking error signal (−) during writing is in the low state during writing. Following this, the sub-tracking error signal (−) received through time-division A/D conversion by the A/D converter 11, as indicated by (4), has gone to the high state at the point in time that writing is started, unlike the state in (2). In this way, when both of the tracking error signals (+) and (−) are obtained respectively through time division by the A/D converter 11, then there may be cases wherein, at the point in time of the beginning of writing, the one tracking error signal (+) will receive a signal of the state when reading, and the other tracking signal (−) will receive a signal of the state when writing. In this case, there will be a discrepancy between the tracking error signal (+) and the tracking error signal (−), and, as illustrated in (5), an unstable sub-tracking error signal (STE) will be outputted temporarily.

Furthermore, as indicated in (2), slightly after the commencement of writing, the sub-tracking signal (+), received through A/D conversion, will go to the high level, producing the proper state. On the other hand, as indicated by (5), an unstable period will continue for a long time for the sub-tracking error signal (STE) used in tracking control. This is because the low-pass filter 60 for removing noise is inserted after the AGC 50, illustrated in FIG. 2, when generating the sub-tracking error signal, and there is a delay block (not shown) after the low-pass filter 60, so that the output from the low-pass filter 60 will remain at the time of reading. Given this system, this delay block is unavoidable.

Here, in the conventional low-pass filter 60, the noise removal band is set to 10 kHz when reading, and set to 600 Hz when writing. This means that a long time will be required until the correct sub-tracking error signal (STE) will be outputted, because the unstable period of the sub-tracking error signal will continue over a long period of time because of the large increase in the time constant RC due to the substantial drop in the noise removal frequency of the low-pass filter 60 from 10 kHz to 600 Hz in the unstable period at the beginning of writing. That is, the state wherein the tracking operation is unstable continues until the proper sub-tracking error signal (STE) is outputted.

The present invention focuses on the low-pass filter 60 in the circuit that generates the sub-tracking error signal (STE) to achieve an improvement in the period of the unstable tracking operation.

Figure 4:
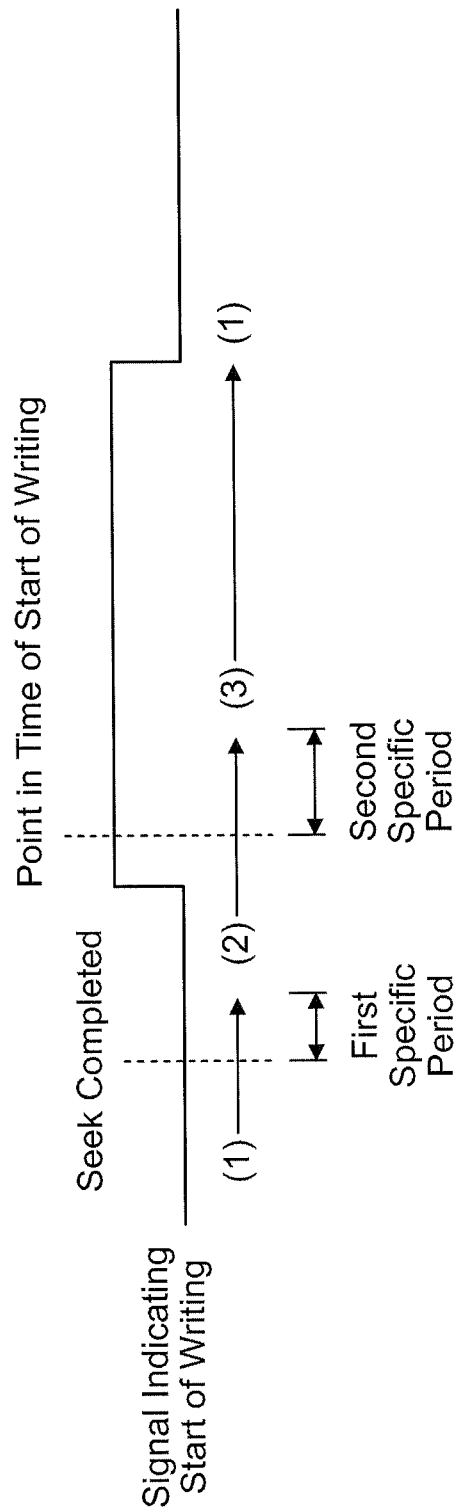
FIG. 4 is a diagram illustrating the relationships between the operation of the optical disc device and the low-pass filter noise removal band in the first embodiment of the present invention.

FIG. 4 is a diagram illustrating the correspondence relationship between the operation of the optical disc device 1 and the state of the setting for the noise removal band of the low-pass filter 60 from the time of receiving the WRITE START signal until writing is started. First, in the reading stage, the noise removal band of the low-pass filter 60 is set to 10 kHz (1). In the transition stage from reading to writing, that is, in a first specific time interval from when the optical disc device 1 has received a WRITE START signal until the time at which the optical pickup 3 has completed seeking the writing location, the main processor 5a sets the noise removal band of the low-pass filter 60 to 2 kHz (2). Moreover, after a second specific time interval that is a writing stage, starting with the point in time wherein writing is started, the main processor 5a sets the noise removal band of the low-pass filter 60 to 600 Hz (3). When transitioning to the reading operation, the noise removal band of the low-pass filter 60 is set again to 10 kHz (1).

Figure 5:
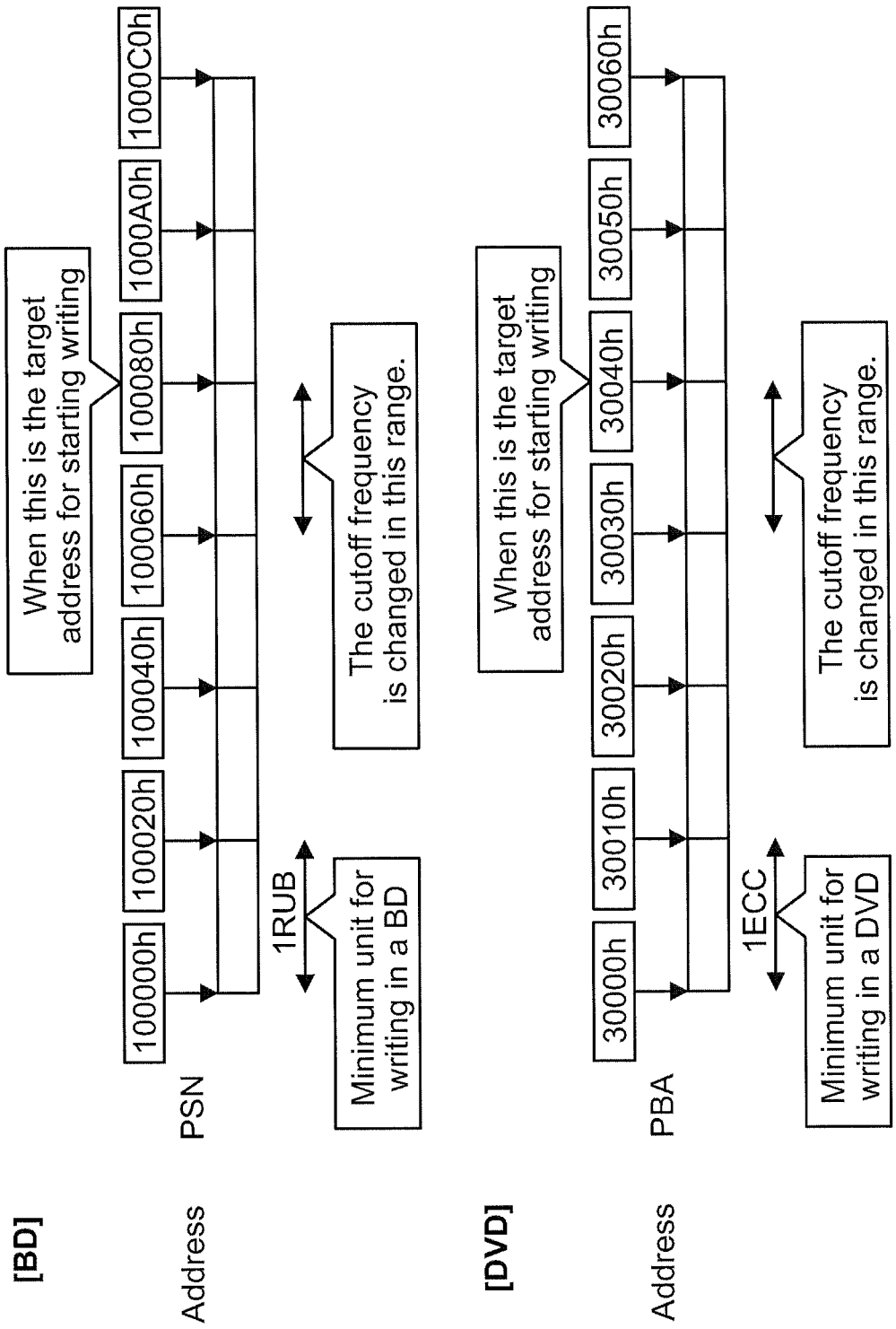
FIG. 5 is a schematic diagram illustrating the writing address in a BD or DVD disc according to the first embodiment of the present invention.

FIG. 5 is for explaining in detail the first specific period when the main processor 5a sets the noise removal band of the low-pass filter 60 to 2 kHz, a schematic diagram illustrating the write addresses of the optical disc. The top figure in FIG. 5 illustrates an address in an optical disc that is a Blu-ray disc (BD), and the bottom figure illustrates an address in an optical disc that is a DVD, showing the addresses for each individual block (BD: 1RUB, DVD: 1ECC).

First, in the case of the Blu-ray disc in the top figure, at the point that the optical pickup 3 has completed seeking the writing location, the main processor 5a determines the target address for starting writing. If, here, the address that is determined is 10080h, then this address serves as the target address for starting writing. The main processor 5a sets the noise removal band of the low-pass filter 60 to 2 kHz (2) at the point in time wherein the address (100060h) that is one block prior to the target address for starting writing (100080h) is detected.

Furthermore, in the case of the DVD in the bottom diagram as well, the main processor 5a determines the target address for starting writing at the point in time that the optical pickup 3 completes seeking the writing location. Here, if the address that is determined is 30040h, then this address serves as the target address for starting writing. The main processor 5a sets the noise removal band of the low-pass filter 60 to 2 kHz at the point in time that the address (30030h) that is one block prior to the target address (30040h) for starting writing is detected (2).

For example, when transitioning from reading to writing, the switching to an intermediate value (2 kHz) for the cutoff frequency is performed by determining the address that is the target for starting writing, and switching at the point in time that one block prior to that address is detected. If the switch were more than one block prior, then there would be the possibility that this could span between a region that has been written and a region that has not been written, which could produce variability in a separate signal given the variability in the levels of the signals when reading a region that has been written versus reading a region that has not been written (with the cutoff being made lower, which would require more time until settling to the steady state).

Figure 6:
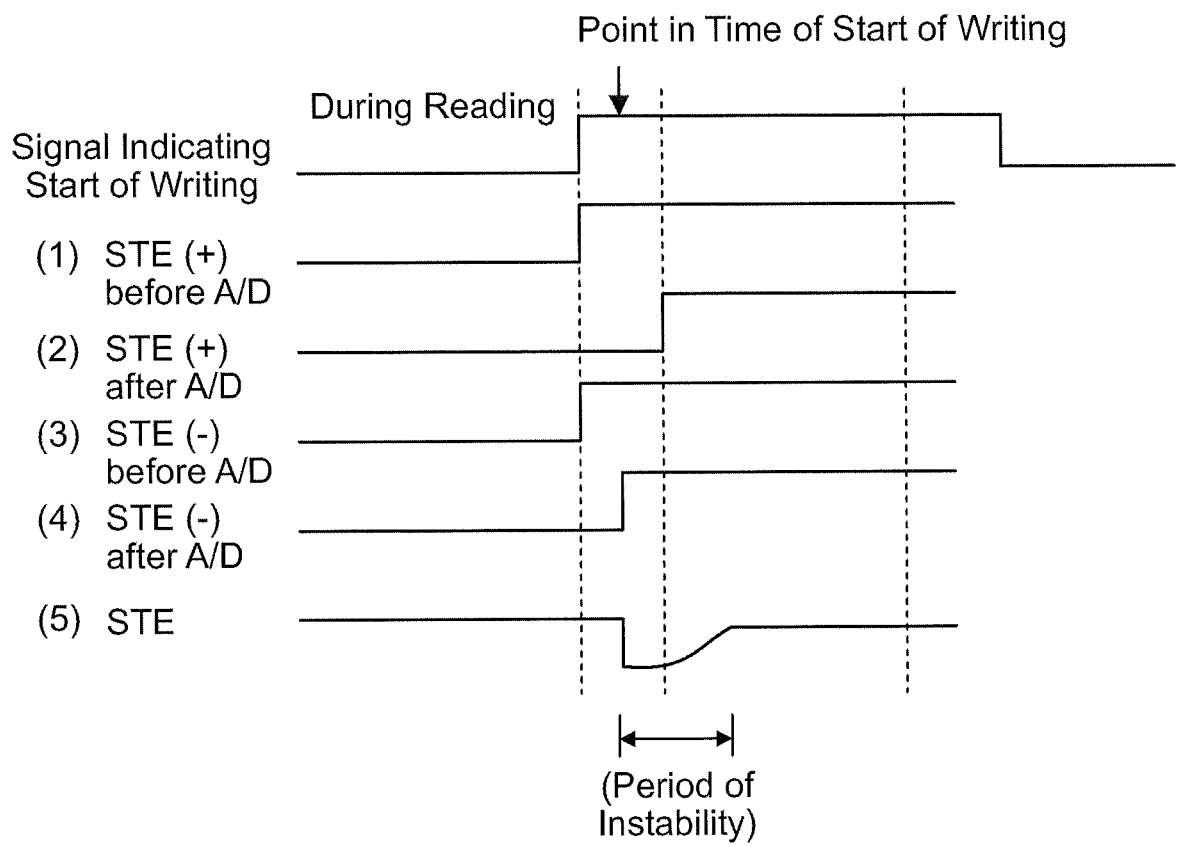
FIG. 6 is a diagram illustrating the output of the sub-tracking error signal in the optical disc device according to the first embodiment of the present invention.

In FIG. 6, (5) indicates the output of the sub-tracking error signal (STE) in the case of switching the noise removal band of the low-pass filter 60 as shown in FIG. 4 at the stage between receiving the WRITE START signal and starting writing. As indicated in this diagram, switching the setting for the low-pass filter 60 as described above makes it possible to reduce the period of instability of the sub-tracking error signal (STE).

Note that the intermediate cutoff frequency (2 kHz, in the above) at the time of transition from reading to writing may be nearer to the cutoff frequency for when writing (for example, 600 Hz). On the other hand, the nearer to the cutoff frequency for when writing, the greater the time until the steady state is achieved, and thus the intermediate cutoff frequency must be set balancing both considerations.

Additionally, while the low-pass filter 60 was switched in two stages from reading to writing, it may instead be switched in three stages or four stages. Furthermore, while the setting for the low-pass filter 60 was set from 10 kHz to 2 kHz, it may instead be set from 10 kHz to 1 kHz or from 10 kHz to 3 kHz. According to one or more embodiments of the present invention, stepwise switching of the noise removal band of the low-pass filter 60 reduces the period of instability of the sub-tracking error signal (STE), enabling better tracking control.

Furthermore, in the same way, a time lag is produced in the output for the main tracking error signal as well when performing A/D conversion using time division. Because of this, it is possible to reduce the period of instability of the main tracking error signal due to the time lag by switching, in a stepwise manner, the noise removal band of the low-pass filter 61 illustrated in FIG. 2, as described above.

Figure 7:
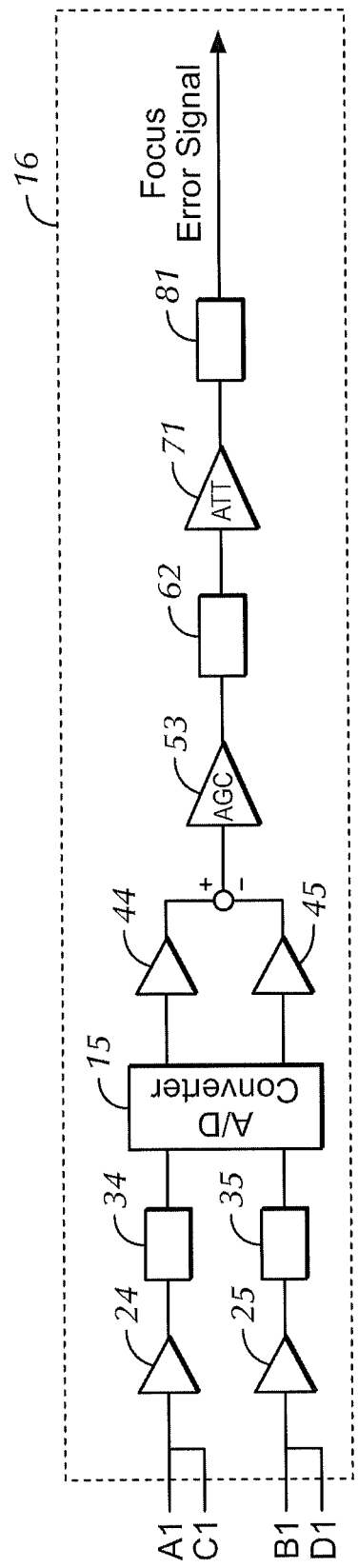
FIG. 7 is a circuit diagram of a focus error signal generating circuit in the optical disc device according to the first embodiment of the present invention.

Moreover, while the explanation was for a tracking error signal generating circuit 10 in the first embodiment, one or more embodiments of the present invention can also be applied to the focus error signal generating circuit (servo error signal generating means) 16. As illustrated in FIG. 7, the focus error signal generating circuit 16 has the same circuit structure as the tracking error signal generating circuit 10.

The focus error signal generating circuit 16, illustrated in FIG. 7, has amplifiers 24 and 25, for amplifying the signals from the detector 4, and low-pass filters 34 and 35, for removing the noise components.

The focus error signal generating circuit 16 is provided with a single A/D converter (A/D converting means) 15 for converting into a digital signal, through time division, the analog signals (A1+C1) and (B1+D1) after an amplification process in the amplifiers 24 and 25 and a filter process, and provided with amplifiers 44 and 45 for adjusting the balance of the outputs of the signals (A1+C1) and (B1+D1) after A/D conversion.

The difference of the power from the amplifier 44 and the power from the amplifier 45 is taken and inputted into the gain controller (AGC) 53. The focus error signal generating circuit 16 is provided with a low-pass filter (noise removing means) 62 for removing the noise included in the output of the gain controller (AGC) 53. The output from the low-pass filter 62, from which the noise has been removed, is outputted through an attenuator 71 and a low-pass filter 81 as the focus error signal. The low-pass filter 62 is a digital filter, wherein the frequency for noise removal is switchable.

In the focus error signal generating circuit 16 as well, as was the case for the tracking error signal generating circuit 10, a time lag is produced in the outputs when performing A/D conversion through time division by the A/D converter 15. Because of this, it is possible to reduce the period of instability of the focus error signal due to the time lag through switching, in a stepwise manner, the noise removal band of the low-pass filter 62 illustrated in FIG. 7, as described above.

Note that while in the first embodiment the noise removal band for the low-pass filter 60 was set to an intermediate frequency (2 kHz in the above) when transitioning from reading to writing, setting the noise removal band of the low-pass filter 60 to an intermediate frequency is a method that is equally effective when transitioning from writing to reading as well. Similarly, setting the noise removal band of the low-pass filter 62 of the focus error signal generating circuit 16 to an intermediate frequency is also an effective technique.

Moreover, while the explanation in the first embodiment was for the three-beam method, the present invention is not limited to three-beam-type optical disc devices, but rather may be applied also to optical disc devices wherein a single laser beam is incident on the optical disc and the reflected beam is split into three beams (main and subs) through a hologram, or the like (the one-beam method).

Second Embodiment

Figure 8:
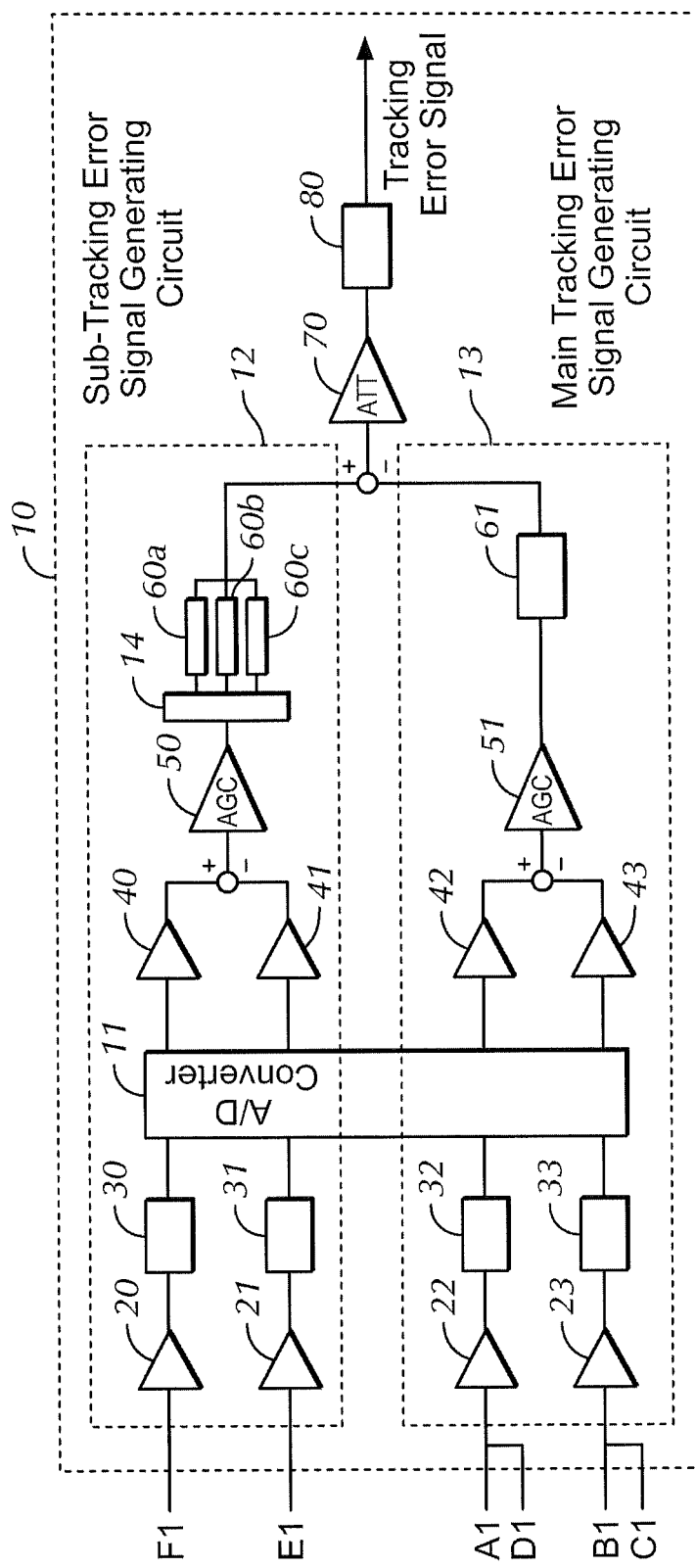
FIG. 8 is a circuit diagram of the tracking error signal generating circuit of an optical disc device according to a second embodiment of the present invention.

FIG. 8 illustrates a tracking error signal generating circuit 10 in an optical disc device according to a second embodiment. While in the first embodiment a digital filter was used for the low-pass filter 60, in the second embodiment analog low-pass filters 60a, 60b, and 60c are used, and a selector 14 is used to switch between the low-pass filter 60a, 60b, or 60c that is used. Note that those parts that are identical to that which was explained in FIG. 2 are assigned identical codes, and explanations thereof are omitted.

The noise removal band of the low-pass filter 60a is 10 kHz. The noise removal bands of the low-pass filter 60b and the low-pass filter 60c are, respectively, 2 kHz and 600 Hz.

As with the first embodiment, FIG. 4 will be used to explain the details of the settings of the low-pass filters 60a, 60b, and 60c, illustrated in FIG. 8. First, in the reading stage, the 10 kHz low-pass filter 60a is selected by the selector 14, illustrated in FIG. 8, based on an instruction from the main processor 5a.

As a result, in the reading stage the sub-tracking error signal (STE) that is outputted from the AGC 50 is outputted through the 10 kHz low-pass filter 60a (1). Following this, at the stage between reading and writing, that is, between the point in time after the optical disc device 1 has received a WRITE signal, when the optical pickup 3 has completed seeking the writing location, up to after the first specific time period, the selector 14 selects the low-pass filter 60b based on an instruction from the main processor 5a.

This causes the sub-tracking error signal (STE) that is outputted from the AGC 50 to be outputted through the 2 kHz low-pass filter 60b (2). Furthermore, in the writing stage, after the second specific time interval at the time when the writing is started, the selector 14 selects the low-pass filter 60c based on an instruction from the main processor 5a, so that the sub-tracking error signal (STE) outputted from the AGC 50 is outputted through the 600 Hz low-pass filter 60c (3). When transitioning again to the reading operation, the selector 14 selects the low-pass filter 60a, based on an instruction from the main processor 5a, so that the sub-tracking error signal (STE) from the AGC 50 is outputted through the 10 kHz low-pass filter 60a.

EXPLANATION OF REFERENCE NUMERALS

1: Optical Disc Device
3: Optical Pickup
5a: Main Processor (Noise Removal Band Switching Means)
7: Tracking Actuator (Servo Controlling Means)
8: Focus Actuator (Servo Controlling Means)
11: A/D Converter (A/D Converting Means)
12: Sub-Tracking Error Signal Generating Circuit (Servo Error Signal Generating Means)
15: A/D Converter (A/D Converting Means)
16: Focus Error Signal Generating Circuit (Servo Error Signal Generating Means)
60, 60a, 60b, 60c, 62: Low-Pass Filters (Noise Removing Means)

The invention claimed is:

1. An optical disc device comprising:
    an optical pickup that causes a laser beam to be incident on an optical disc and detects a reflected beam;
    A/D converting means for converting into a digital signal a plurality of analog signals obtained from the reflected beam detected b the optical pickup;
    servo error signal generating means for generating a servo signal for the optical pickup based on the digital signal converted by the A/D converting means;
    noise removing means for removing noise of a specific band included in the servo error signal generated by the servo error signal generating means;
    noise removal band switching means for switching a noise removal band of the noise removing means based on states of the optical disc; and
    servo controlling means for performing servo control for the optical pickup based on the servo error signal from which the noise has been removed by the noise removing means,
    wherein the states of the optical disc include states during reading of the optical disc, writing of the optical disc, switching from reading to writing, and switching from writing to reading.

2. The optical disc device as set forth in claim 1, wherein the A/D converting means converts the digital signal through time division.

3. The optical disc device as set forth in claim 1, wherein:
    when in the state of switching from reading to writing or from writing to reading, the noise removal band switching means switches the noise removal band of the noise removing means to a noise removal band lower than a noise removal band during reading of the optical disc and higher than a noise removal band during writing of the optical disc.

4. The optical disc device as set forth in claim 1, wherein:
    when in the state of switching from reading to writing or from writing to reading, the noise removal band switching means performs the switching of the noise removal band of the noise removing means in an interval between a time of detection of an address one block prior to a target address on the optical disc and a time of detecting the target address.

5. The optical disc device as set forth in claim 1, wherein:
    the noise removal band switching means sets, respectively, the noise removal band to:
    10 kHz in the state of reading of the optical disc,
    600 Hz in the state of writing of the optical disc, and
    2 kHz in the state of switching from reading to writing or from writing to reading.

6. The optical disc device as set forth in claim 3, wherein:
    when in the state of switching from reading to writing or from writing to reading, the noise removal band switching means performs the switching of the noise removal band of the noise removing means in an interval between a time of detection of an address one block prior to a target address on the optical disc and a time of detecting the target address.

7. The optical disc device as set forth in claim 1, wherein: the noise removal band switching means sets, respectively, the noise removal band to:
   10 kHz in the state of reading of the optical disc,
   600 Hz in the state of writing of the optical disc, and
   2 kHz in the state of switching from reading to writing or from writing to reading.

8. The optical disc device as set forth in claim 2, wherein: the noise removal band switching means sets, respectively, the noise removal band to:
   10 kHz in the state of reading of the optical disc,
   600 Hz in the state of writing of the optical disc, and
   2 kHz in the state of switching from reading to writing or from writing to reading.

9. The optical disc device as set forth in claim 3, wherein: the noise removal band switching means sets, respectively, the noise removal band to:
   10 kHz in the state of reading of the optical disc,
   600 Hz in the state of writing of the optical disc, and
   2 kHz in the state of switching from reading to writing or from writing to reading.

10. The optical disc device as set forth in claim 4, wherein: the noise removal band switching means sets, respectively, the noise removal band to:
    10 kHz in the state of reading of the optical disc,
    600 Hz in the state of writing of the optical disc, and
    2 kHz in the state of switching from reading to writing or from writing to reading.

11. An optical disc device comprising:
    an optical pickup that causes a laser beam to be incident on an optical disc and detects a reflected beam;
    an A/D converter that converts into a digital signal a plurality of analog signals obtained from the reflected beam detected by the optical pickup;
    an error signal generating circuit that generates a servo signal for the optical pickup based on the digital signal converted by the A/D converter;
    a low-pass filter that removes noise of a specific band included in the servo error signal generated by the error signal generating circuit;
    a main processor that switches a noise removal band of the low-pass filter based on states of the optical disc; and
    an actuator that performs servo control for the optical pickup based on the servo error signal from which the noise has been removed by the low-pass filter,
    wherein the states of the optical disc include states during reading of the optical disc, writing of the optical disc, switching from reading to writing, and switching from writing to reading.

12. The optical disc device as set forth in claim 11, wherein the A/D converter converts the digital signal through time division.

13. The optical disc device as set forth in claim 11, wherein: when in the state of switching from reading to writing or from writing to reading, the main processor switches the noise removal band of the low-pass filter to a noise removal band lower than a noise removal band during reading of the optical disc and higher than a noise removal band during writing of the optical disc.

14. The optical disc device as set forth in claim 11, wherein: when in the state of switching from reading to writing or from writing to reading, the main processor performs the switching of the noise removal band of the low-pass filter in an interval between a time of detection of an address one block prior to a target address on the optical disc and a time of detecting the target address.

15. The optical disc device as set forth in claim 11, wherein: the main processor sets, respectively, the noise removal band to:
    10 kHz in the state of reading of the optical disc,
    600 Hz in the state of writing of the optical disc, and
    2 kHz in the state of switching from reading to writing or from writing to reading.

16. The optical disc device as set forth in claim 13, wherein: when in the state of switching from reading to writing or from writing to reading, the main processor performs the switching of the noise removal band of the low-pass filler in an interval between a time of detection of an address one block prior to a target address on the optical disc and a time of detecting the target address.

17. The optical disc device as set forth in claim 11, wherein: the main processor sets, respectively, the noise removal band to:
    10 kHz in the state of reading of the optical disc,
    600 Hz in the state of writing of the optical disc, and
    2 kHz in the state of switching from reading to writing or from writing to reading.

18. A servo control method for an optical disc device, the method comprising:
    causing a laser beam to be incident on an optical disc and detecting a reflected beam;
    converting into a digital signal a plurality of analog signals obtained from the reflected beam;
    generating a servo signal based on the converted digital signal;
    removing noise of a specific band included in the generated servo error signal;
    switching a noise removal band based on states of the optical disc; and
    performing servo control based on the servo error signal from which the noise has been removed,
    wherein the states of the optical disc include states during reading of the optical disc, writing of the optical disc, switching from reading to writing, and switching from writing to reading.

* * * * *